United States Patent [19]
Nabeshima et al.

[11] Patent Number: 5,930,008
[45] Date of Patent: Jul. 27, 1999

[54] IMAGE READING DEVICE AND METHOD

[75] Inventors: Takayuki Nabeshima; Keiji Kusumoto; Makoto Kumagai; Katsuaki Tajima, all of Toyokawa, Japan

[73] Assignee: Minolta Co., Ltd., Osaka, Japan

[21] Appl. No.: 08/783,053

[22] Filed: Jan. 14, 1997

[30] Foreign Application Priority Data

Jan. 16, 1996 [JP] Japan ................................ H8-004916

[51] Int. Cl.⁶ ............................ H04N 1/04; G03B 27/68
[52] U.S. Cl. ............................................ 358/496; 355/52
[58] Field of Search ..................... 358/406, 461, 358/488, 496–498; 355/30, 52, 75.77; 382/274, 275; 399/98

[56] References Cited

U.S. PATENT DOCUMENTS

| | | | |
|---|---|---|---|
| 3,909,128 | 9/1975 | Sohm | 355/8 |
| 3,989,371 | 11/1976 | Valentine | 355/14 |
| 4,494,861 | 1/1985 | Tachika et al. | 355/14 |
| 4,536,077 | 8/1985 | Stoffel | 355/8 |
| 4,937,623 | 6/1990 | Nishimori et al. | 355/233 |
| 5,214,470 | 5/1993 | Denber | 355/75 |
| 5,339,139 | 8/1994 | Fullerton et al. | 355/215 |

FOREIGN PATENT DOCUMENTS 5-122468  5/1993  Japan.

*Primary Examiner*—Edward L. Coles
*Assistant Examiner*—Derrick Fields
*Attorney, Agent, or Firm*—McDermott, Will & Emery

[57] ABSTRACT

The present invention has the objective of providing an image reading device capable of normally excellent reading of document images without influence from a soiled or damaged glass document platen, and eliminates the influence of a soiled or damaged glass surface of a document platen by normally reading document images using a new glass surface which is neither soiled not damaged by moving the document platen via a platen moving lever.

23 Claims, 9 Drawing Sheets

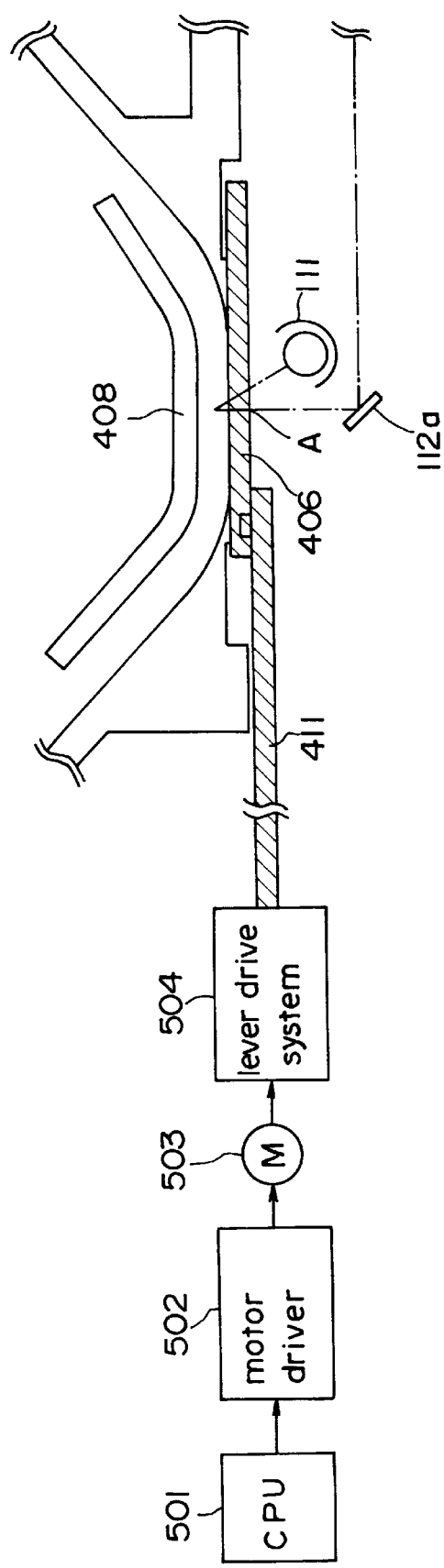
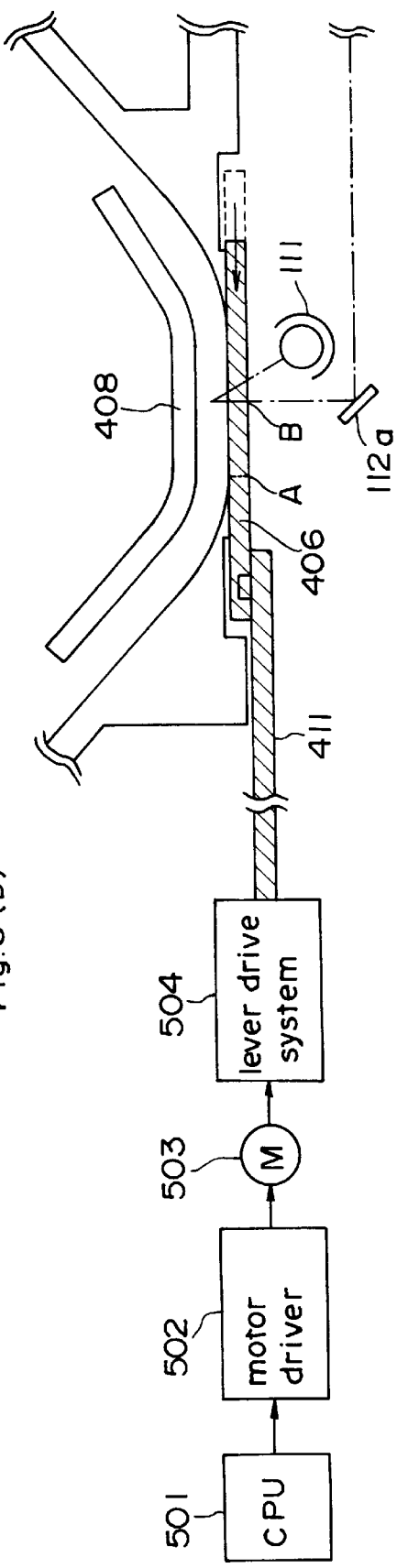

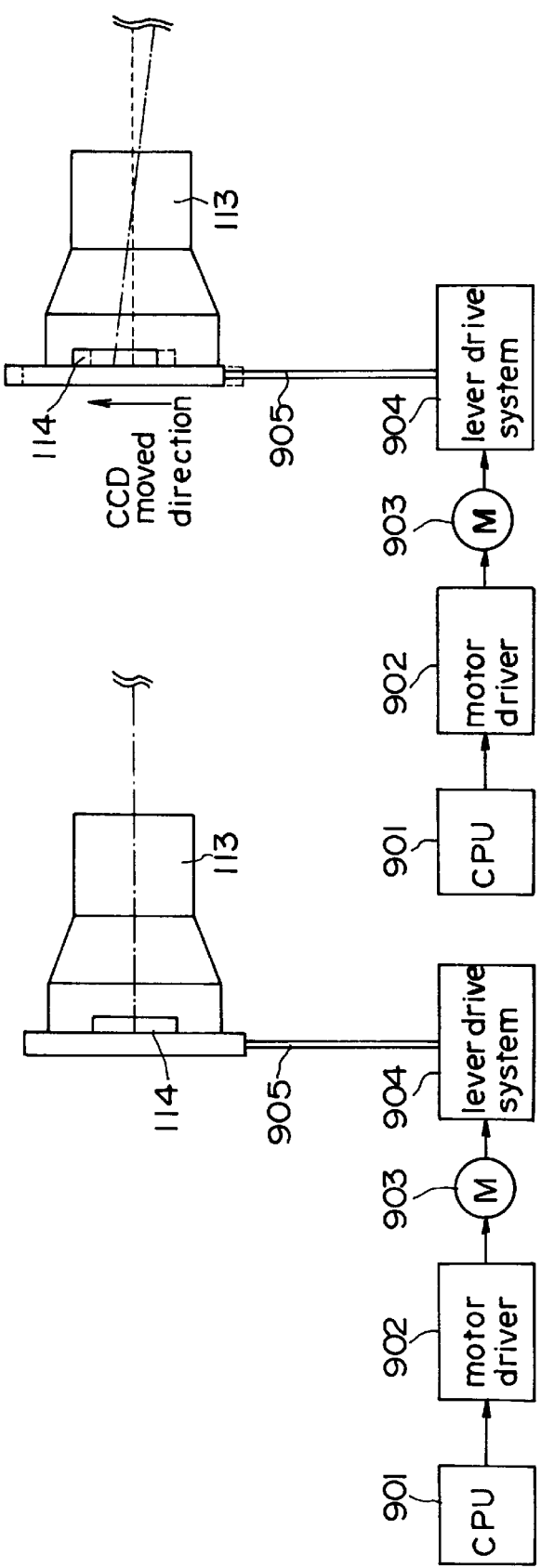

IMAGE READING DEVICE AND METHOD

BACKGROUND OF THE INVENTION

1. Field of the Invention

The present invention relates to an image reading device, and specifically relates to an image reading device and method for optically reading a document image through a glass document platen.

2. Description of the Related Art

In the field of conventional image reading devices, methods have been proposed for cleaning the glass document platen using a cleaner as a countermeasure for soiling or injury to the glass document platen caused by image reading by a stationary device. Specifically, Japanese Unexamined Patent Application No. HEI 5-122468 discloses an image reading device provided with a cleaning roller for cleaning the document reading area of the reading means and which is positioned so as to allow passage or stop said reading means outside the document placement region of a document platen and which rotatably drives said cleaning roller each predetermined number of scanning revolutions of said reading means so as to improve reading accuracy by preventing soiling of the document surface and preventing inadequate reading of a document image caused by soiling of the document reading surface of said reading means.

The aforesaid conventional image reading devices are disadvantageous insofar as when the glass surface of the document platen becomes soiled only a cleaning roller, cleaning sheet or the like is used to wipe the soiled glass surface, such that when a residue remains on said glass surface the reading of an image of a document cannot be adequately accomplished. A further disadvantages arises in that in order to avoid leaving a residue, a lengthy cleaning time is required as well as a complicated cleaning mechanism. A still further disadvantage arises when the glass surface itself of the document platen is damaged in that the cleaning will not remove the defect, and as a result, reading of an image of a document cannot be adequately accomplished.

SUMMARY OF THE INVENTION

An object of the present invention is to provide an excellent image reading device and method.

Another object of the present invention is to provide an image reading device capable of normally excellent reading of documents without influence from a soiled or damaged glass surface of the document platen.

The image reading device of the present invention is an image reading device for optically reading the image of original documents, said image reading device comprising a glass document platen, a transport means for transporting a document in a predetermined direction onto said glass document platen, a reading means for optically reading the image of a document transported by said transporting means through said glass document platen, a measuring means for measuring measurement data relating to the optical characteristics of said glass document platen, comparison means for comparing said measurement data with predetermined reference data, and a moving means for moving the relative position of said reading means and said glass document platen in accordance with the comparison result of said comparison means.

The image reading method of the present invention is a method wherein a document is read by an unsoiled portion of the glass document platen or reading means when a soiled glass document platen or soiled reading means itself is detected, and a document is read by reading the direction directly when no soil is detected on said glass document platen or said reading means.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 3 is a block diagram showing the construction of the drive unit of the glass document platen moving lever shown in FIG. 2;

FIG. 9 is a block diagram showing the construction of the CCD moving unit shown in FIG. 8.

DESCRIPTION OF THE PREFERRED EMBODIMENTS

Figure 1:
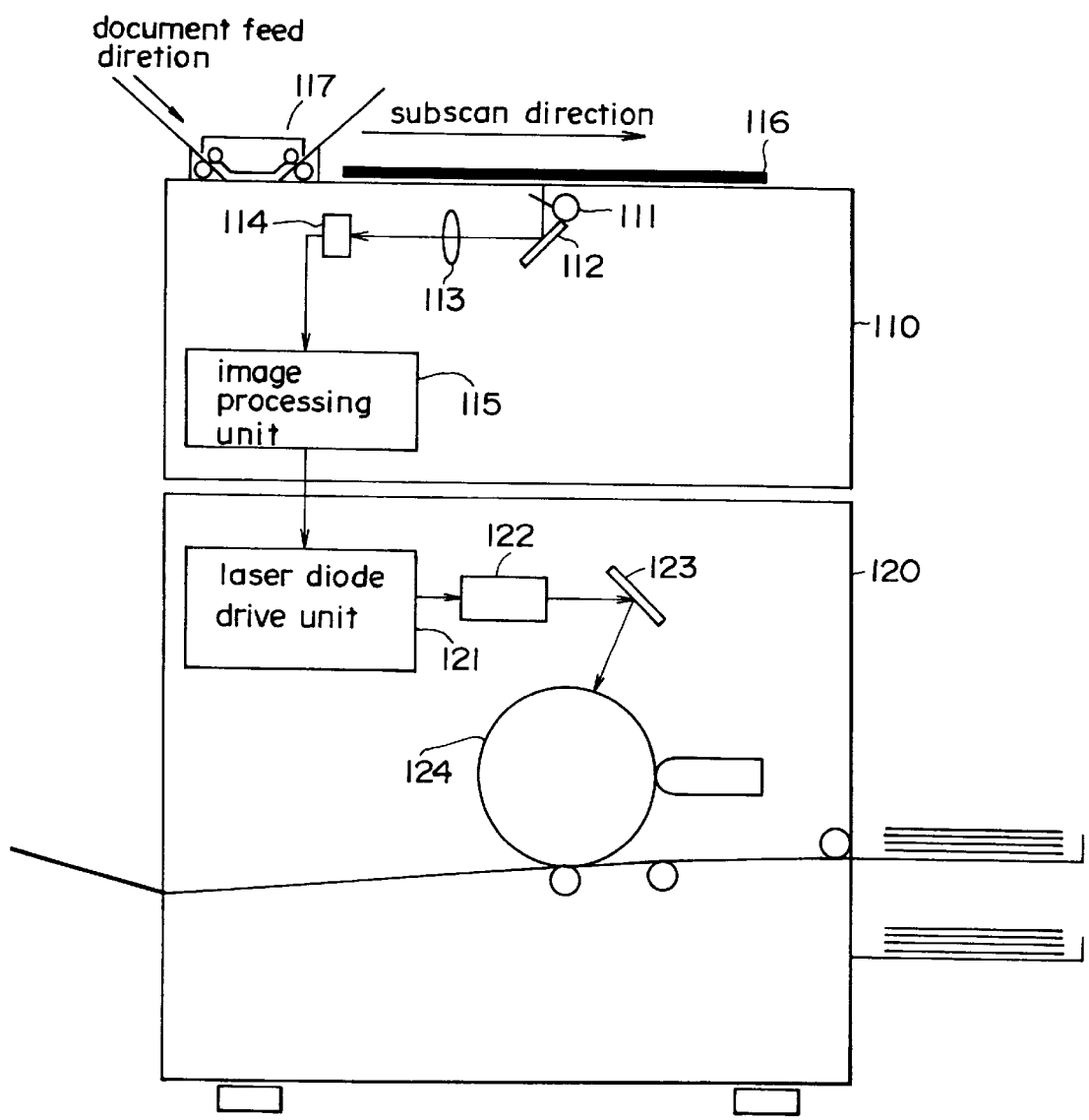
FIG. 1 is a section view showing the overall construction of a digital copying apparatus as an embodiment of the image reading device of the present invention.

The present invention is described hereinafter in terms of its embodiments as the image reading device of a digital copying apparatus with reference to the accompanying drawings. FIG. 1 is a section view showing the construction of a digital copying apparatus as an embodiment of the present invention.

The digital copying apparatus comprises a top unit of image reading unit 110 and a bottom unit of image recording unit 120. The image reading unit 110 comprises a stationary placement document reading device 116 and a fed document reading device 117.

In image reading unit 110 using a compact optical system is used to emit light from a light source 111 to expose a document, and the light reflected from said document surface forms an image on a linear charge-coupled device (CCD) 114 via mirrors 112 and a lens 113, so as to obtain photoelectrically converted analog signals. The resolution of CCD 114 is 400 dots per inch (dpi), and the maximum document size is an A3 size sheet (i.e., about 5,000 dots per line).

After the photoelectrically converted analog signals are converted to digital data in image processing unit 115, said data are subjected to image processing such as variable magnification, image quality correction and the like, and output as digital data from image reading unit 110.

If scanning of a document is defined such that the scanning direction of linear CCD 114 is the main scan direction and the subscan direction is a direction perpendicular to said main scan direction, then scanning of a stationary document is accomplished by CCD 114 scanning in the main scan direction of a document placed on glass document and the document is transported in the subscan direction via fed document platen 409, and moving mirrors 112 in a horizontal direction via a drive source (not illustrated) to scan in the subscan direction. In the case of fed document reading, CCD 114 scans in the main scan direction of the document passing over glass document platen 406, and the document is transported in the subscan direction by fed document reading device 117. The image signals are sequentially transferred for each single line of the main scan.

In image recording device 120, digital image data output from the image reading device 110 are converted to analog signals by laser diode drive unit 121. The converted analog signals are then converted to light by laser generator light source 122, and said light forms an image on the surface of a photosensitive drum 124 via a polygonal mirror 123. The image formed on the surface of photosensitive drum 124 is reproduced as an image of 256 halftones at 400 dpi by an electrophotographic process by regulating the amount of light and the amount of adhered toner via controlling the current input to laser light source 122.

Figure 2:
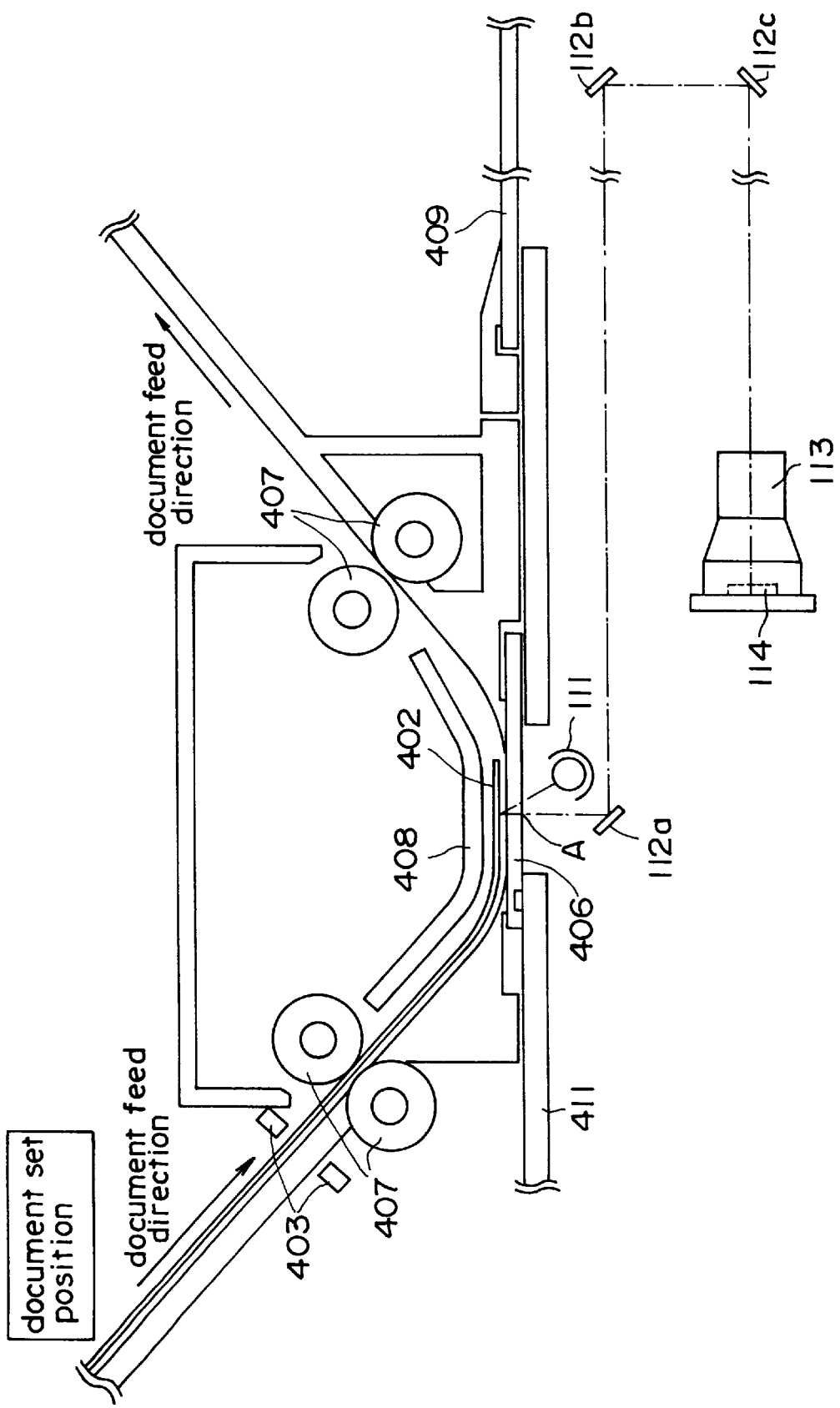
FIG. 2 is a section view showing the construction of the fed document reading unit of the digital copying apparatus of FIG. 1.

The fed document reading unit comprising fed document reading device 117, light source 111, mirrors 112, lens 113, CCD 114 and the like is described in detail hereinafter. FIG. 2 is an enlarged section view of the fed document reading unit of the digital copying apparatus of FIG. 1.

When a document 402 is placed at the document set position and detected by document sensor 403, light source 111 and mirror 112a (FIG. 1 shows only a mirror 112a as mirrors 112 and other mirrors 112b and 112c are omitted to simplify the drawing) are moved to a predetermined reading location. In this state, the glass surface of the glass document platen 406 used for the fed document is read, and a determination is made as to whether or not the glass surface of glass document platen 406 is soiled. If the glass surface is not soiled, the document feed roller 407 is rotated, the document is transported to the reading position while being pressed by document cover 408, and the document is read as it is being transported. The light emitted from light source 111 is reflected by the surface of document 402 through glass document platen 406, and impinges CCD 114 via mirrors 112a, 112b, 112c, and lens 113.

On the other hand, if the glass surface of glass document platen 406 is soiled or damaged, the platen moving lever 411 used for moving the document is moved so as to move the glass document platen 406. After the aforesaid movement, the image of the document is read as previously described using the glass surface of glass document platen 406 which is neither soiled nor damaged.

Although the platen moving lever 411 is used to move the glass document platen 406 in the aforesaid fed document reading unit, the similar effect can be achieved by moving the relative positions of the document and reading optical system (comprising light source 111, mirrors 112a, 112b, 112c, lens 113, and CCD 114) and the glass document platen 406, e.g., using other methods such as moving the document and reading optical system.

The actuating portion of platen moving lever 411 shown in FIG. 2 is described below. FIG. 3 is an enlargement of the actuating portion of platen moving lever 411 shown in FIG. 2.

The data of the glass surface is read at reading position A of glass document platen 406 in the state shown in FIG. 3(a). At this time, when the part of glass platen 406 is soiled or damaged at reading position A, a motor driver 502 actuates a stepping motor 503 in accordance with a drive command issued from a central processing unit (CPU) 501 as shown in FIG. 3(b) and in accordance with an operation flow described later, whereupon the rotational movement of stepping motor 503 is converted to a linear movement by the lever drive system 504 so as to move the platen moving lever 411. The glass document platen 406 is therefore moved in the arrow direction in the drawing in conjunction with the movement of the platen moving lever 411.

Thus, it is possible to read the image of the document using the clean reading position B shown in FIG. 3(b) rather than the soiled reading position A shown in FIG. 3(a) by moving the glass document platen 406 in the manner described.

Figure 4:
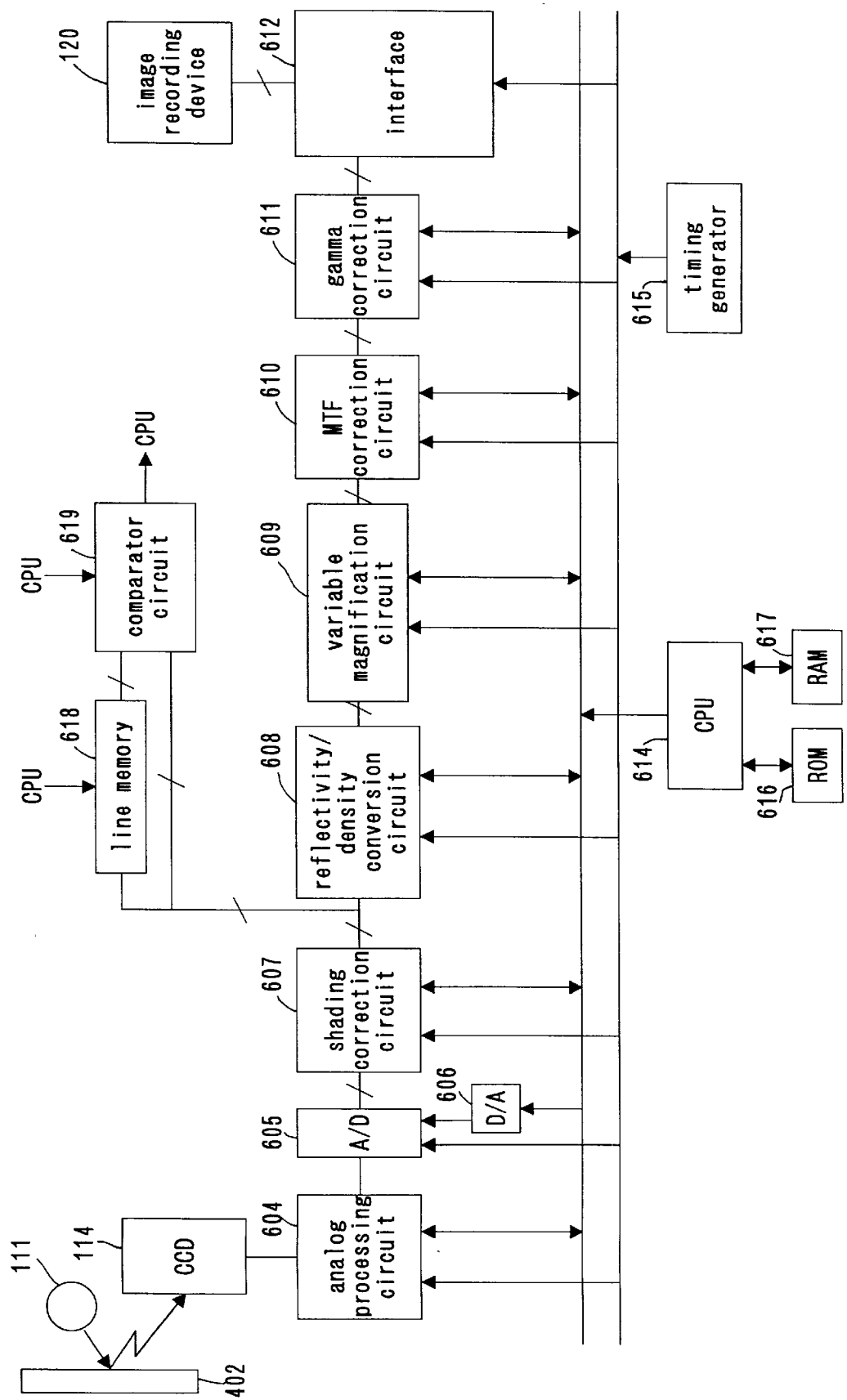
FIG. 4 is a block diagram showing the construction of the image processing unit of the digital copying apparatus of FIG. 1.

The image processing unit 115 shown in FIG. 1 is described in detail below. FIG. 4 is a block diagram showing the construction of the image processing unit 115 of FIG. 1.

Light source 111 illuminates the document 402, and the light reflected from said document is received by CCD 114, which outputs analog signals in accordance with the amount of received light. The analog signals output by CCD 114 are processed by an analog processing circuit 604, and converted to digital signals by analog-to-digital (A/D) converter 605. The reference level of the A/D converter 605 is set by digital-to-analog (D/A) converter 606.

The image signals which have been converted to digital signals are corrected for irregular light source alignment, nonuniform sensitivity between pixels of CCD 114 and the like via a shading correction circuit 607, so as to be converted to flat data for output. Since these data are as yet the document reflectivity data, said data are converted to density data via reflectivity/density conversion circuit 608. If necessary the image is subjected to variable magnification via variable magnification circuit 609, MTF correction by MTF correction circuit 610, and gamma correction by gamma correction circuit 611. The image data subjected to the aforesaid processes are then transmitted to an image recording device 120 via an interface 612. The aforesaid general and drive controls are accomplished by controls signals output from a CPU 614 and timing generator 615.

When reading a moving document, a slider is moved to the flow position at the moment a document is set, and the data of the glass surface of document platen 406 is read by CCD 114 before the document is fed. After the image data are subjected to shading correction by shading correction circuit 607, they are compared, via comparator circuit 619, to the glass surface data of document platen 406 in an unsoiled state previously stored in line memory 618, and the comparison result is transmitted to CPU 614. In CPU 614, the glass surface of document platen 406 is determined to be soiled if the difference between the aforesaid comparison data exceeds a constant value, and a predetermined command is output to move the glass document platen 406 as shown in FIG. 3.

Figure 5:
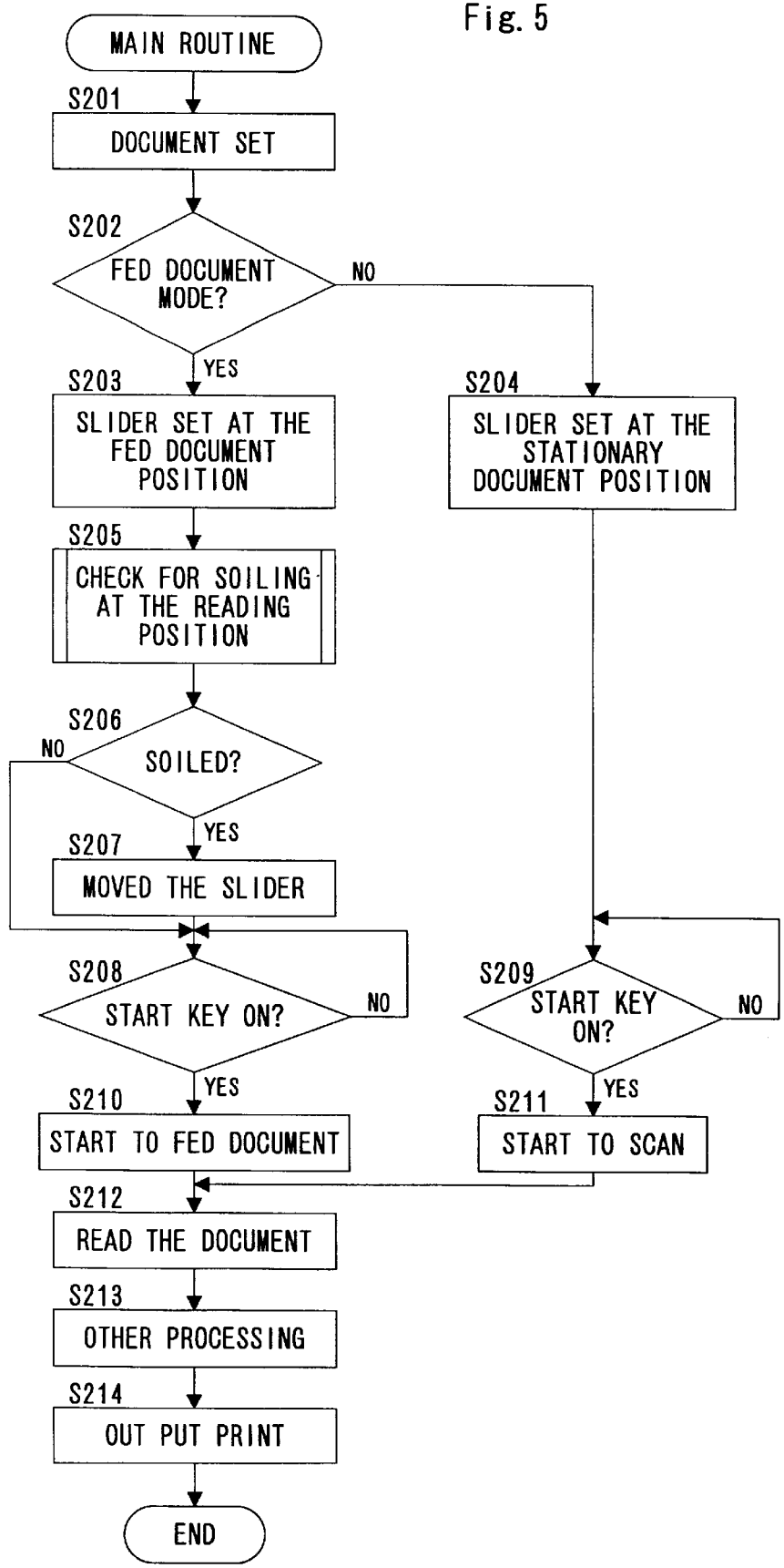
FIG. 5 is a flow chart of the general controls of the digital copying apparatus of FIG. 1.

The operation of the digital copying apparatus of the previously described construction is fully described below. FIG. 5 is a flow chart of the general controls of the digital copying apparatus of FIG. 1.

First, a user sets a document to be copied by the digital copier (S201). The document is set at either the stationary document position or the fed document position (S202), and the slider is moved accordingly (S203, S204).

When the slider is set at the fed document position (S203), the document platen 406 is checked for soiling or damage at the reading position (S205, S206), and the device is maintained in a standby state if the surface is unsoiled, whereas the reading position of the document platen 406 is moved a suitable amount only if the glass surface is soiled (S207). When the copy key is pressed (S208), the document is fed (S210), the image of the document is read using the unsoiled reading position of the glass document platen 406 (S212), and after predetermined processing (S213) the image is printed (S214).

The aforesaid movement of glass document platen 406 may be a periodic movement without detecting the whether or not the glass surface is soiled or damaged. Furthermore, the reading position may be moved relatively by moving the document feed mechanism and reading optical system without moving the glass document platen 406.

On the other hand, when a document is placed at the stationary reading position, the slider position is moved (S204), and when the copy key is pressed (S209), the slider scans (S211), and the reading of the document starts as previously described (S212 to S214).

Figure 6:
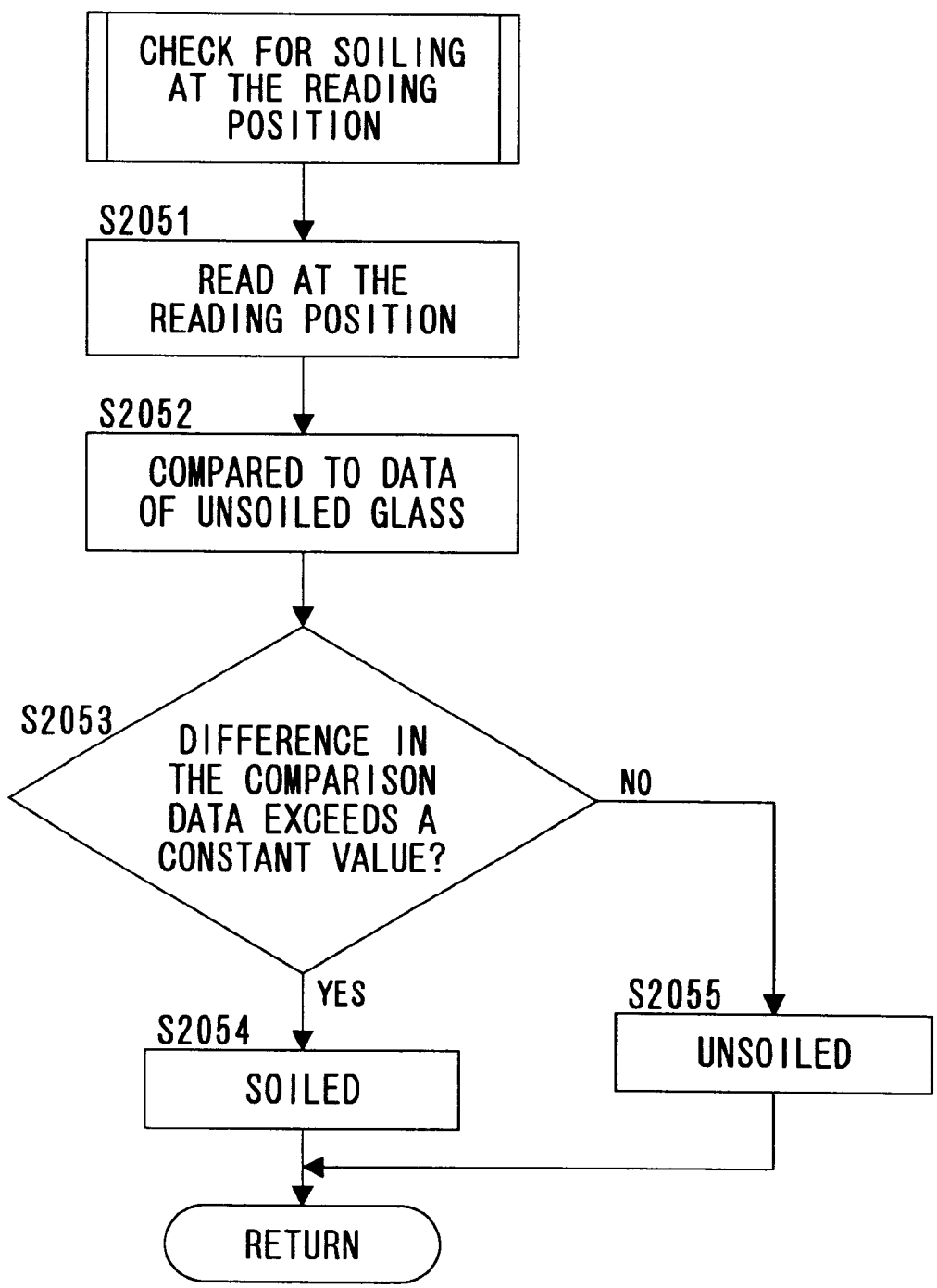
FIG. 6 is a flow chart of the soil check process of the glass document platen of FIG. 5.

The glass platen soil check process (S205) of FIG. 5 is described in detail below. FIG. 6 is a flow chart illustrating the soil checking operation of the glass document platen shown in FIG. 5.

After the slider is set at the fed document reading position the glass surface of document platen 406 is read at the reading position without feeding the document (S2051). Then, the glass surface data are compared to data of unsoiled glass surface of platen 406 stored in memory (S2052), and the glass surface is determined to be soiled or damaged if the difference in the comparison data exceeds a constant value due to dirt or the like (S2054), whereas the glass surface is determined to be clean and undamaged if the difference in the comparison data is less than said constant value (S2055). The platen moving lever 411 is moved as shown in FIGS. 2 and 3 based on the aforesaid comparison result, such that reading of the document normally can be accomplished using a clean glass surface of glass document platen 406.

Figure 7:
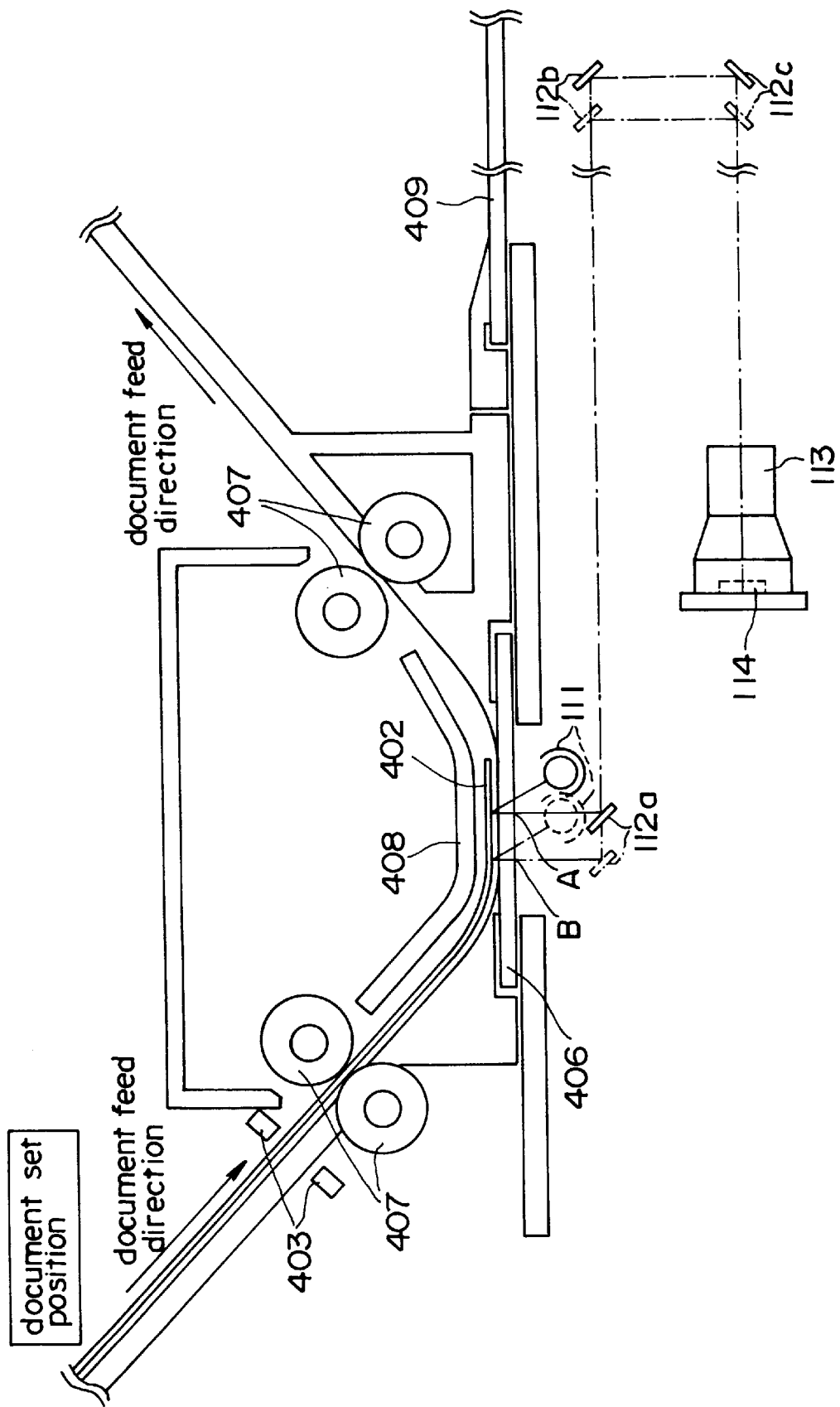
FIG. 7 is a section view showing other constructions of the fed document reading unit of the digital copying apparatus of FIG. 1.

Other examples of the fed document reading unit of the digital copying apparatus of FIG. 1 are described below. FIG. 7 is a section view showing the construction of another example of a fed document reading unit. Although a method of moving the glass document platen 406 for fed document reading is shown in FIG. 2, FIG. 7 shows a method wherein document platen 406 is stationary and the document slider is moved. Other than the device shown in FIG. 7, the construction is identical to that of the previously described digital copier and is therefore omitted from the following discussion.

When a document 402 is set at the document set position and detected by document sensor 403, light source 111 and mirrors 112*a*, 112*b*, 112*c* are moved to positions corresponding to a predetermined reading position A (i.e., positions indicated by the solid line in the drawing). In this state, the glass surface of document platen 406 is read at reading position A, and a determination is made as to whether or not said glass surface is soiled. If the glass surface is not soiled, the document feed roller 407 is rotated, the document 402 is transported to the reading position A while being pressed by document cover 408, and the document is read as it is being transported. That is, the light emitted from light source 111 is reflected by the surface of document 402 at reading position A, and impinges CCD 114 via mirrors 112*a*, 112*b*, 112*c*, and lens 113.

On the other hand, if the glass surface of glass document platen 406 is soiled, the document slider is moved, and light source 111 and mirrors 112*a*, 112*b*, 112*c* are moved such that the reading position is reading position B (i.e., position indicated by the dashed line in the drawing). After the aforesaid movement, the image of the document is read as previously described at reading position B where the glass surface of glass document platen 406 is not soiled. At this time, the leading edge position of the document image is shifted in conjunction with the amount of movement of the reading position so as to accomplish the reading of the image.

In this case, because the reading position of glass document platen 406 can be moved an amount coincident only to the movement of the document slider, i.e., the relative positions of the document platen 406 and reading optical system can be moved, a more compact device can be attained and the cost of the device can be reduced by enlarging the readable range of document platen 406 used for fed document reading beforehand without requiring a new drive mechanism.

Figure 8:
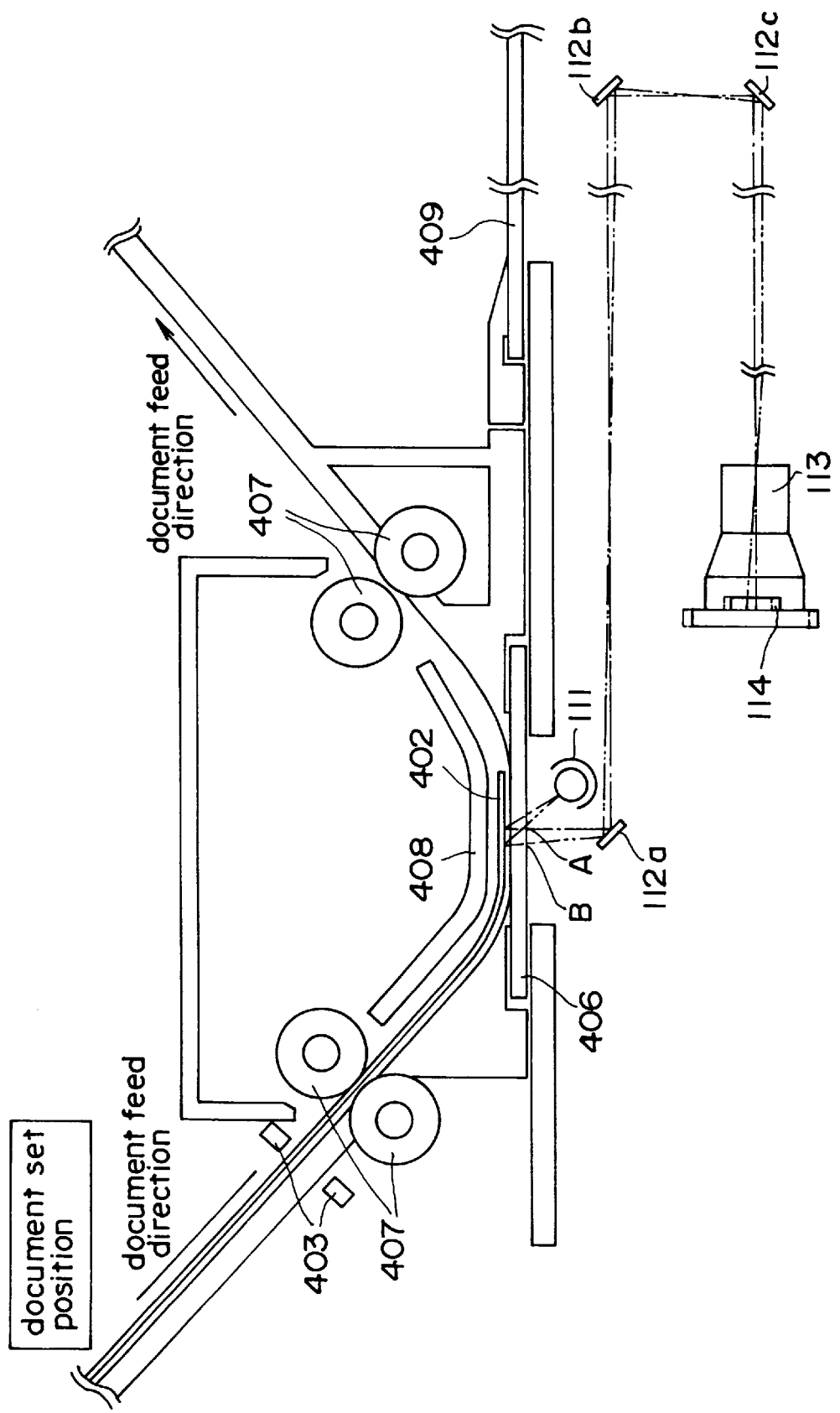
FIG. 8 is a section view showing other constructions of the fed document reading unit of the digital copying apparatus of FIG. 1.

Another example of the fed document reading unit of the digital copier shown in FIG. 1 is described below. FIG. 8 shows another example of the construction of the fed document reading unit of the digital copier of FIG. 1. Whereas FIG. 2 illustrates a method of moving the document platen 406 used for moving the document and FIG. 7 illustrates a method for moving the document slider while document platen is stationary, FIG. 8 shows a method for moving CCD 114 while both document platen 406 and the document slider are stationary. Other than the device shown in FIG. 8, the construction is identical to that of the previously described digital copier and is therefore omitted from the following discussion.

When a document 402 is set at the document set position and detected by document sensor 403, light source 111 and mirrors 112*a*, 112*b*, 112*c* are moved to positions corresponding to a predetermined reading position A (i.e., positions indicated by the solid line in the drawing). In this state, the glass surface of document platen 406 is read at reading position A, and a determination is made as to whether or not said glass surface is soiled. If the glass surface is not soiled, the document feed roller 407 is rotated, the document 402 is transported to the reading position A while being pressed by document cover 408, and the document is read as it is being transported. That is, the light emitted from light source 111 is reflected by the surface of document 402 at reading position A, and impinges CCD 114 via mirrors 112*a*, 112*b*, 112*c*, and lens 113. On the other hand, when the glass surface of glass document platen 406 is soiled at reading position A, the CCD 114 is moved from the position indicated by the solid line in the drawing to the position indicated by the dashed line. Thus, the optical path is altered by moving CCD 114, such that the document image is read at reading position B where the glass surface of glass document platen 406 is not soiled. At this time, the leading edge position of the document image is shifted in conjunction with the amount of movement of the reading position so as to accomplish the reading of the image.

In this case, the reading position can be moved and enlarged simply by slightly moving CCD 114 using the optical path length of the optical system. Accordingly, the fed document reading unit can be constructed using a more compact drive system. The moving portion of the CCD shown in FIG. 8 is described below. FIG. 9 is a block diagram showing the construction of the moving portion of the CCD.

The data of glass document platen 406 is read in the state shown in FIG. 9(*a*). If the glass surface of document platen 406 is soiled, the motor driver 902 actuates stepping motor 903 to move CCD moving lever 905 via lever drive system 904 in conjunction with the flow charts of FIGS. 5 and 6. As a result, the position of CCD 114 can be moved from the position indicated by the solid line to the position indicated by the dashed line.

Therefore, it is possible to read a document image using the clean reading position B rather than using the soiled reading position A shown in FIG. 8.

The image reading apparatus of the present invention described above comprises a glass document platen, a transport means for transporting a document in a predetermined direction onto said glass document platen, a reading means for optically reading the image of a document transported by said transporting means through said glass document platen, a measuring means for measuring data relating to the optical characteristics of said glass document platen, and a moving means for moving the relative position of said reading means and said glass document platen in accordance with the measurement data obtained by said measuring means, and provides normally excellent reading of document images without influence from a soiled or damaged glass surface of the glass document platen because it is capable of normally reading a document image using a clean glass surface even when the glass surface of the glass document platen is soiled or damaged by suitably moving the relative positions of the glass document platen and the reading means.

Furthermore, the image reading apparatus of the present invention provides a comparison means for comparing measurement data with predetermined reference data, and is constructed in such a way that the moving means moves the relative positions of the document platen and reading means in accordance with the comparison result of the comparison means, and is capable of normally excellent reading of document images by a simple process of comparing measurement data with predetermined reference data as well as simpler control of the moving means.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading device for optically reading images of original documents, said image reading device comprising:

a document platen;

a transport means for transporting a document in a predetermined direction onto said document platen;

a reading means for optically reading the image of the document transported by said transporting means through said document platen;

a measuring means for measuring the optical characteristics of said document platen to provide measurement data; and a moving means for moving a relative position of said reading means and said document platen in accordance with the measurement data of said measuring means.

2. The image reading device as claimed in claim 1, wherein the moving means moves said document platen.

3. The image reading device as claimed in claim 1, wherein the moving means moves said reading means.

4. The image reading device as claimed in claim 1, wherein said reading means includes a lamp, a mirror and a CCD.

5. The image reading device as claimed in claim 4, wherein the moving means moves said lamp and said mirror.

6. The image reading device as claimed in claim 4, wherein the moving means moves said CCD.

7. The image reading device as claimed in claim 1, further comprising, a comparison means for comparing measurement data with predetermined reference data wherein said moving means moves the relative positions of the document platen and reading means in accordance with the comparison result of the comparison means.

8. An image reading device for optically reading the image of original documents, said image reading device comprising:

a document platen;

a transport means for transporting a document in a predetermined direction onto said document platen;

a reading means for optically reading the image of the document transported by said transporting means through said document platen and for measuring the optical characteristics of said document platen to provide measurement data;

a moving means for moving the relative position of said reading means and said document platen in accordance with the measurement data of said reading means.

9. The image reading device as claimed in claim 8, wherein the moving means moves said document platen.

10. The image reading device as claimed in claim 8, wherein the moving means moves said reading means.

11. An image reading device as claimed in claim 8, wherein said reading means includes a lamp, a mirror and a CCD.

12. The image reading device as claimed in claim 11, wherein the moving means moves said lamp and said mirror.

13. The image reading device as claimed in claim 11, wherein the moving means moves said CCD.

14. The image reading device as claimed in claim 8, further comprising, a comparison means for comparing measurement data with predetermined reference data wherein said moving means moves the relative positions of the document platen and reading means in accordance with the comparison result of the comparison means.

15. An image reading method used in an image reader which reads a document image projected on an image sensor by an optical element, said image reading method comprising steps of detecting the soil of an optical element by said image sensor, locating the soiled portion of the optical element out of the optical path for reading when said image sensor detect the soiled portion of said optical element, and reading a document by said image sensor through said optical path where unsoiled portions of the optical elements are located.

16. An image reading method used in an image reader which reads a document image projected on an image sensor by an optical element, said image reading method comprising steps of detecting the soil of a optical element, moving the optical element to locate the soiled portion of the optical element out of an optical path, and reading a document by said image sensor through said optical path where unsoiled portions of the optical elements are located.

17. An image reading device for optically reading images of original documents, said image reading device comprising:

a document platen;

a transport means for transporting a document in a predetermined direction onto said document platen;

an image reading means for optically reading the image of the document transported by said transporting means through said document platen;

a scanning means for scanning platen for optically reading the image of the document on said document platen by said image reading means;

a measuring means for measuring the optical characteristics of said document platen to provide measurement data; and a moving means for moving the relative position of said reading means and said document platen in accordance with the measurement data of said measuring means.

18. The image reading device as claimed in claim 17, wherein the moving means moves said document platen.

19. The image reading device as claimed in claim 17, wherein the moving means moves said reading means.

20. The image reading device as claimed in claim 17, wherein said reading means includes a lamp, a mirror and a CCD.

21. The image reading device as claimed in claim 20, wherein the moving means moves said lamp and said mirror.

22. The image reading device as claimed in claim 20, wherein the moving means moves said CCD.

23. The image reading device as claimed in claim 17, further comprising, a comparison means for comparing measurement data with predetermined reference data wherein said moving means moves the relative positions of the document platen and reading means in accordance with the comparison result of the comparison means.

* * * * *